UNITED STATES PATENT OFFICE.

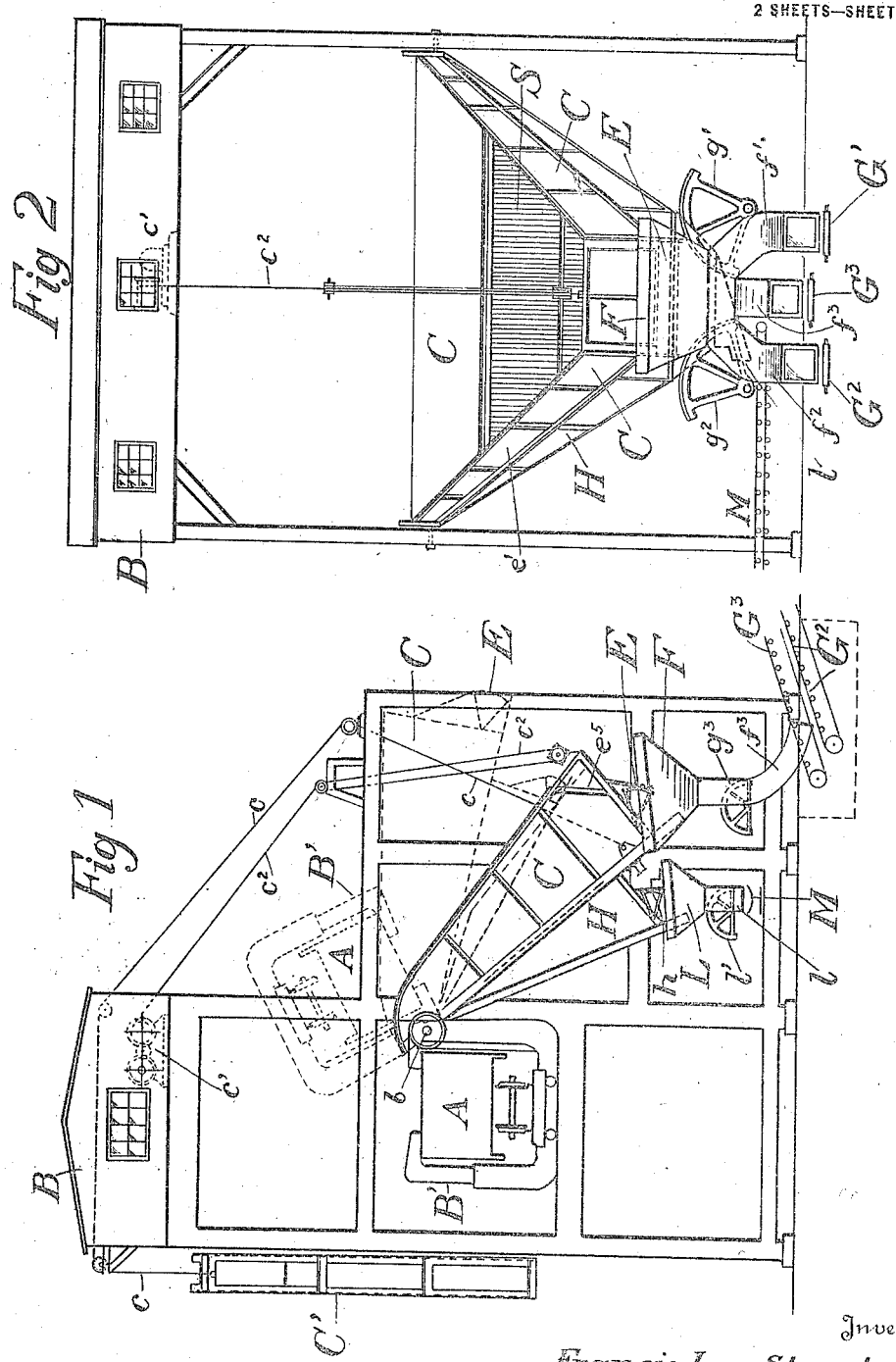

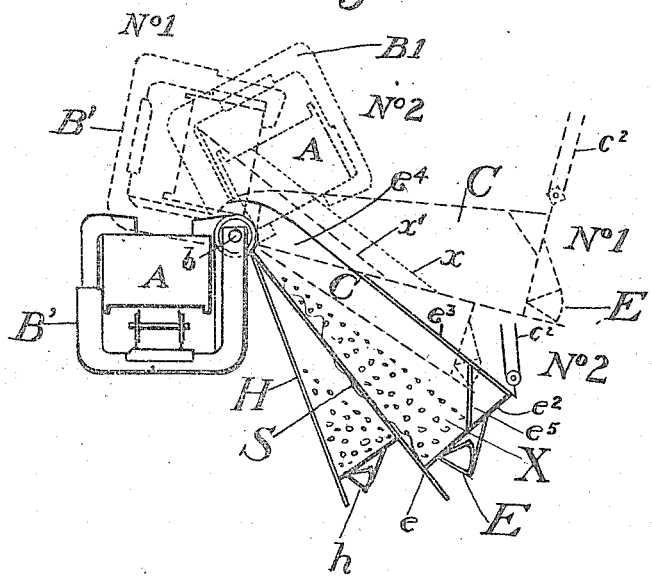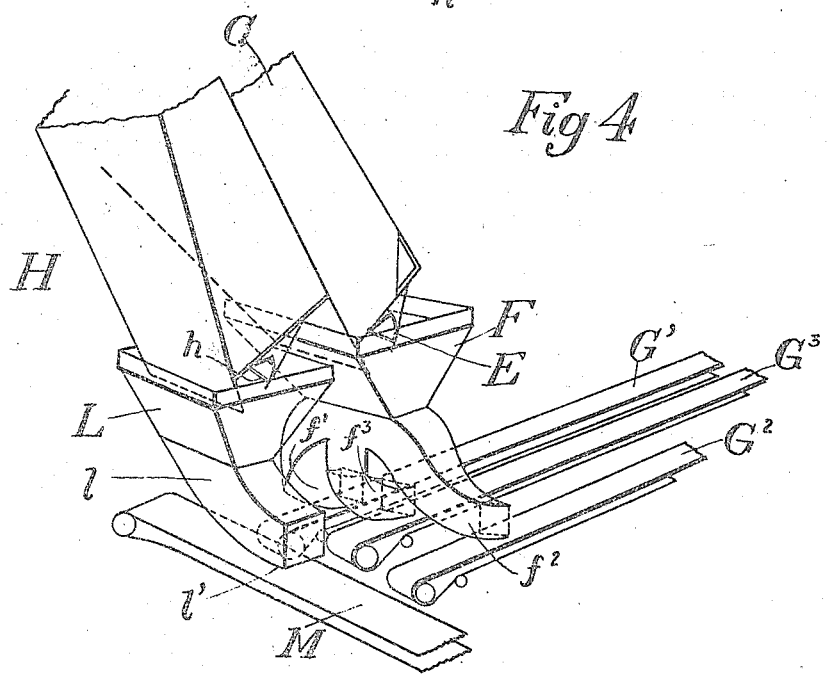

FRANCIS LEE STUART, OF BALTIMORE, MARYLAND.

APPARATUS FOR LOADING AND UNLOADING.

1,270,896.

Specification of Letters Patent.

Patented July 2, 1918.

Application filed May 12, 1916. Serial No. 96,987.

*To all whom it may concern:*

Be it known that I, FRANCIS LEE STUART, a citizen of the United States, residing in Baltimore, Maryland, have invented certain new and useful Improvements in Apparatus for Loading and Unloading, of which the following is a specification.

This invention relates to apparatus for unloading and for loading and storing coal, ore, etc., of the class in which means is provided for transferring the material from cars or other carriers to conveyers which deliver it to storage bins or piles or to ships, barges or other carriers for transportation.

My present invention relates particularly to apparatus which receives the material from carriers, such as dump-cars, and lowers it to the level of devices which deliver it to conveyers, such as belt conveyers, by means of which it is carried to storage or to loading apparatus which delivers it to its destination.

The primary object of my invention is to provide mechanism which shall receive the material from such carriers as dumping cars with as little dropping of the material or friction as possible and which shall gently lower it and deliver it to other conveyers with a minimum amount of breakage.

I will describe my invention as applied to apparatus in which the material is conveyed by dump-cars to a dumping tower which is equipped with a bin which receives the material from the dump-car and which lowers it to hoppers which in turn deliver it to belt conveyers. The bin is pivoted to move about the same axis or approximately the same axis on which the dumping cradle swings and said bin is divided into compartments separated by a screen whereby the smaller material may be separated from the larger and the two grades of material are deposited on separate conveyers which carry them to different points of delivery.

In the accompanying drawing,

Figure 1 is a view in side elevation of apparatus for receiving material from loaded cars and lowering it to belt conveyers.

Fig. 2 shows an end elevation of the same.

Fig. 3 is a detail view illustrating particularly how the material is transferred from the cars to the lowering bin.

Fig. 4 is a perspective view showing how the lowering bin delivers the material to the belt conveyers.

The cars A, which may be of any well known construction, are received by the dumping tower B provided with a cradle B' which is hinged at $b$ to the tower frame and which may be raised, lowered and turned or otherwise operated by any appropriate mechanism. While this cradle may be made to contain cars of different heights, it is preferably constructed so that the top of an average open car will not be below the pivot point about which the cradle is adapted to swing. It will be understood, of course, that it is immaterial whether the cradle of the car-dumper has a permanent hinge connection at $b$ with the tower or whether the cradle is elevated from the lower part of the tower until it engages the pivot member at $b$ and is then tilted or turned. Each car delivers to a lowering bin C hinged at $b$ and counterbalanced by weights C1 connected by cables $c$ to the outer portion of the bin. Any suitable mechanism may be employed for raising and lowering the bin at any desired speed which will depend somewhat upon the character or kind of the material being handled.

I have shown, by way of example, a hoisting drum $c^1$ connected by suitable tackle $c^2$ to the bin near its outer free end. It will be observed that the bin C is pivoted to move about the same axis or approximately the same axis $b$ on which the car-dumping-cradle B1 moves. It will be obvious that by so constructing the cradle that the top of the car will not be below the axis of the cradle, it is assured that when the car is dumped the edge of the car will project sufficiently over the edge of the bin to prevent the loss of any material between the car and the bin. Each lowering bin has a bottom $e$ in which is mounted a screen S and it has sides $e^1$, a closed outer end $e^2$ and a discharge gate E. A top $e^3$ closes the outer portion of the bin, but a receiving opening is provided at $e^4$. A plate $e^5$ is arranged diagonally at the lower outer portion of the bin to hold the material away from the upper corner thereof and to more evenly guide it toward the delivery gate. In order to greatly increase the capacity of the bin without interfering with the operation of the apparatus, the bin is made deeper on its outer extremity than on the inner end. Thus even though the amount of material being discharged through the gate E is comparatively restricted the car may be emptied rapidly into the bin.

Below the screen S there is a supplemental bin H which receives the finer material passing through the screen from the bin C. This supplemental bin H is provided with a gate $h$ similar to the gate E. When the car A is elevated to the position No. 1, shown by dotted lines in Fig. 3, the bin should stand at position No. 1 in the same figure, and while in this position the material will usually lie in the condition indicated at $x$. When the car moves to position No. 2, the material will usually assume the condition indicated at $x^1$. At this time the bin is lowered to the position shown by full lines in Fig. 3 and will have received the full load as indicated at X and is then ready to be delivered. It will be observed that the material is transferred from the car to the lowering bin gradually and without material fall and therefore with but little friction or breakage.

When the bin is lowered to the proper extent the gate E is opened and the material passes from the main bin C to a hopper F provided in this instance with three chutes $f^1, f^2, f^3$ which deliver the three conveyers $G^1, G^2, G^3$, which are called feeder belts, and which are preferably of relatively short length and may deliver to other or conveyer belts of greater length. Each of the chutes $f^1, f^2, f^3$, is equipped with a gate $g^1, g^2, g^3$ by means of which the material may be delivered to any one or more of the feeder belts. The supplemental bin H delivers through a gate $h$ to a hopper L having a chute $l$ equipped with a gate $l^1$ and delivering to a conveyer-belt M. Preferably the belt M is arranged at right angles to the belts $G^1, G^2, G^3$ and conveys the finer material laterally to a suitable place of storage.

I claim as my invention:

The combination of a main lowering bin pivoted to move about a horizontal axis, means for lowering the bin, a delivery gate at the outer end of said bin for retaining material while the bin is being lowered, a supplemental bin of less length than the main bin and located below it but mounted to turn therewith, a screen interposed between said bins, a delivery gate at the outer end of said supplemental bin, a hopper to which the main bin delivers when lowered to its full extent, and another hopper to which the supplemental bin delivers arranged in rear of the first-mentioned hopper.

In testimony whereof, I have hereunto subscribed my name.

FRANCIS LEE STUART.

Witnesses:
E. R. SPARKS,
A. H. SCHAEFFER.